Dec. 23, 1952  W. D. LUCAS ET AL  2,622,435
SEDIMENT TESTER HEAD
Filed Sept. 15, 1948
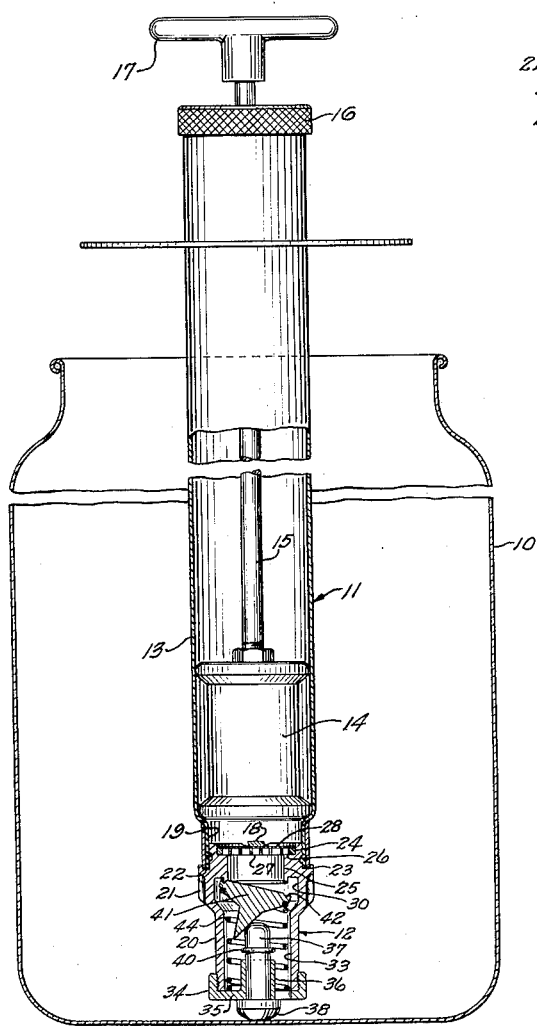
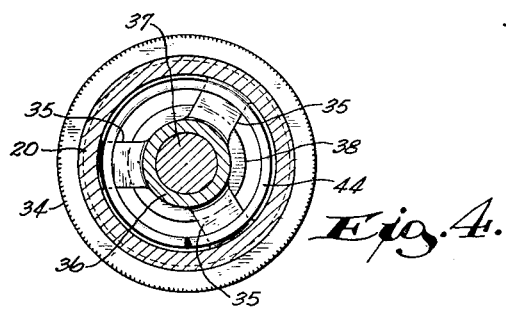
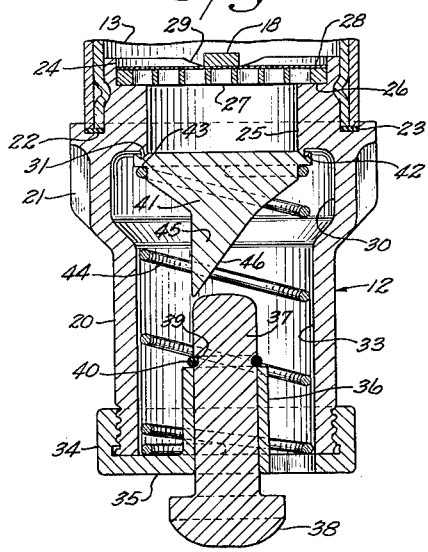
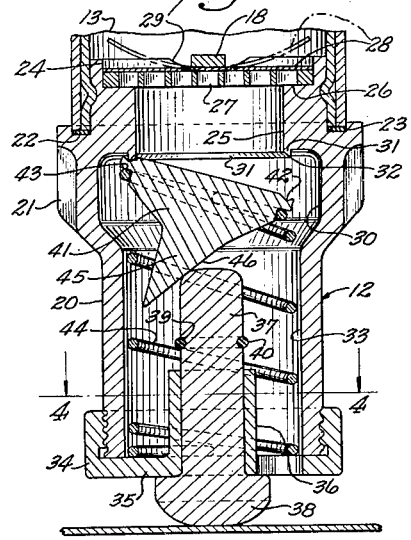
INVENTORS
Walter Ebert
Walter D. Lucas
Joseph S. Kessler
BY Morsell & Morsell
ATTORNEYS Patented Dec. 23, 1952

2,622,435

UNITED STATES PATENT OFFICE 2,622,435

SEDIMENT TESTER HEAD

Walter D. Lucas, Walter Ebert, and Joseph S. Kessler, Kenosha, Wis., assignors to Lillian King, Chicago, Ill.

Application September 15, 1948, Serial No. 49,346

9 Claims. (Cl. 73—61)

This invention relates to improvements in sediment tester heads.

Sediment testers are commonly used by the dairy industry to obtain samples of milk from milk cans or the like so that the samples may be examined for sediment and dirt. It is absolutely necessary that these samples be taken from adjacent the bottom of the milk can rather than from a point intermediate the height thereof. Conventional sediment testers have not been altogether satisfactory because of the fact that some of them permit the taking of a sample of milk before the tester head has reached the bottom of the can.

It is therefore a general object of the invention to provide an improved sediment tester head having novel means for positively preventing the taking of a sample unless the head is in contact with the bottom of the receptacle containing the fluid to be tested.

A further object of the invention is to provide an improved sediment tester head which permits the expulsion of a filtered portion of the sample without regard for the position of the head in the receptacle.

A further object of the invention is to provide an improved sediment tester head of the class described which is adapted for use with either hand or power operated sediment testers.

A further more specific object of the invention is to provide an improved sediment tester head of the class described having a spring loaded valve member therein which is formed with an angled surface, and having an axially slidable plunger projecting from the outer end thereof and positioned to coact with the angled surface of said valve member, the construction being such that said valve member can be opened either by depression of said plunger when the latter contacts the bottom of the receptacle or by fluid pressure on the opposite side of said valve member.

A further object of the invention is to provide an improved sediment tester head of the class described which is relatively simple in construction, which may be quickly and easily disassembled and cleaned, which is strong and durable, and which is otherwise well adapted for the purposes described.

With the above and other objects in view, the invention consists of the improved sediment tester head, and all of its parts and combinations, as set forth in the claims, and all equivalents thereof.

In the drawing accompanying and forming a part of this specification wherein is shown one complete embodiment of the preferred form of the invention; and wherein the same reference characters indicate the same parts in all of the views;

Fig. 1 is a side view of a milk can showing a hand-operated sediment tester positioned therein and provided with an improved head, said can being shown in vertical section and parts of said tester and head being broken away and shown in section;

Fig. 2 is an enlarged vertical sectional view of the improved sediment tester head with the parts thereof in normal position;

Fig. 3 is a view similar to Fig. 2 showing the position of the parts thereof while a sample is being taken; and Fig. 4 is a sectional view taken along the line 4—4 of Fig. 3.

Referring more particularly to Fig. 1 of the drawing, the numeral 10 indicates a conventional milk can, and the numeral 11 indicates a hand operated sediment tester provided with an improved head 12 which forms the subject matter of the present invention.

The sediment tester 11 is comprised of a pump including tubular casing 13 having a piston 14 slidably positioned therein. A piston rod 15 is fixedly connected to the piston 14 and projects exteriorly of the casing 13 through a central aperture in a cap 16 which is threaded onto the upper end of the casing 13. Fixed to the outer end of the piston rod 15 is a handle 17. Fixedly positioned near the lower end of the casing 13 is a diametrically extending bar 18, the purpose of which will appear hereafter.

The lower end of the casing 13 is formed with a portion of reduced diameter 19 for engagement with the head 12. Any suitable means of connection between the portion 19 and the head 12 may be used, the preferred form shown being that of a friction fit which will permit quick disassembly of the parts for cleaning purposes. The head 12 is formed with a tubular body 20 having an enlarged intermediate portion 21 which has formed in its upper surface an annular groove 22. The groove 22 is adapted to receive the lower end of the casing 13. An annular gasket 23, of any suitable material, is preferably positioned in the groove 22 as shown.

The upper end of the body 20 of the head 12 is formed with an enlarged bore portion 24 which communicates with a bore portion 25 of smaller diameter to form an annular shoulder 26. Positioned in the bore 24 and on the shoulder 26 is a removable filter pad supporting disc 27 which is formed with a plurality of perforations therethrough. A circular filter pad 28 is positioned in the upper surface of the disc 27 and is of substantially the same diameter as said disc. When the head 12 is assembled on the lower end of the casing 13, the bar 18 is in engagement with the upper surface of the pad 28 as shown, the body 20 being formed with diametrically opposite notches 29 in its upper end to permit the bar 18 to so engage the filter pad 28.

Adjacent the enlarged portion 21 and communicating with the bore portion 25 is a valve chamber 30 having a relatively large diameter. Around the margin of the lower end of the bore portion 25, the body 20 is formed with a downwardly projecting annular flange 31 which acts as a valve seat. The flange 31 has an outwardly bevelled annular inner surface and an axially extending annular outer surface which merge into an annular knife edge 32 (see Fig. 3).

The lower end of the chamber 30 merges into a bore portion of smaller diameter 33 which extends to the lower end of the body 20. Threaded on the lower end of the body 20 is a cap 34. The cap 34 is preferably formed with three radially projecting arms 35 which support a central integral and upwardly projecting sleeve or boss 36. The bore of the sleeve 36 is preferably coaxial with the bore portions of the body 20, when the cap 34 is assembled on the body 20. Slidably mounted in the sleeve 36 is a plunger 37 having a rounded upper end and having an enlarged head 38 at its lower end which is positioned exteriorly of the cap 34. Spaced from its upper end the plunger 37 is formed with a circumferential groove 39 in which is seated an annular ring 40 of rubber, metal, or other suitable material. The ring 40, by engagement with the upper end of the sleeve 36 prevents the plunger 37 from dropping out of said sleeve.

A valve member 41 coacts with the valve seat 31. The valve member 41 has a substantially flat upper surface which has formed therein an annular V-shaped groove 42, the diameter of the apex of said groove being equal to the diameter of the knife edge 32 of the seat 31. When the valve member 41 is in closed position, the inner bevelled surface of the groove 42 seals against the inner bevelled surface of the seat 31, as shown in Fig. 2. Formed on the opposite side of the valve member 41 is an annular shoulder 43 which is adapted to receive one end of a helical spring 44. The opposite end of the helical spring 44 is supported on the radial arms 35 of the cap 34, as is clearly shown in Fig. 4, and said spring acts to urge the valve member 41 into sealing engagement with the seat 31.

The lower end of the valve member 41 is formed with an integral downwardly projecting wedge shaped portion 45 having an angled or cam surface 46 on one side thereof which is positioned directly above the upper end of the plunger 37. The surface 46 is spaced away from the plunger 37 a short distance when the valve member 41 is in closed position, as is clearly shown in Fig. 2.

In operation, the sediment tester 11 is inserted into the can 10 from which a sample is to be taken, in the manner shown in Fig. 1. The valve member 41 is held in normally closed position by the spring 44 until the head 38 of the plunger 37 contacts the bottom of the can 10 and is depressed by said contact. As the plunger 37 is depressed, it moves to the position of Figs. 1 and 3. In so moving, the plunger slidably engages the surface 46 of the valve member 42, forcing the portion 45 of said valve member outwardly, and causing pivoting of the valve member 41 downwardly about a portion of the seat 32, as is clearly shown in Fig. 3. It will be noted that the construction is such that the valve member 41 cannot be opened by suction created by an upward movement of the piston 14 (as is the case with some head constructions). In order to open the valve 41 and to take a sample, the plunger 37 must be depressed by contact with the bottom of the can 10. This positively insures that the sample is properly taken from the near bottom of the can. With the valve 41 opened by said contact as in Figs. 1 and 3, a sample of fluid can be drawn up into the casing 13 by an upward pull on the handle 17 which moves the piston 14 upwardly. As the fluid flows upwardly through the apertured disc 27, it lifts portions of the filter pad 28, as shown in the dot and dash lines of Fig. 3, causing said pad to bend upwardly on each side of the bar 18.

After the sample has been drawn up into the casing 13 in the manner just described, the sediment tester may be lifted so that the plunger 37 is no longer in contact with the bottom of the can and hence is no longer depressed. The spring 44 will then snap the valve member 41 into the closed position of Fig. 2, and the plunger 37 will slide downwardly by force of gravity to the position shown. To filter the sample and to thereby retain the sediment and dirt suspended therein on the filter pad 28, the fluid is forced downwardly through the filter pad 28 by a downward push on the handle 17. The hydraulic pressure caused by downward movement of the piston 14 in response to the downward push on the handle 17 will push the valve member rectilinearly downwardly off the seat 31, and will permit the filtered fluid to flow therepast into the can 10. If the hydraulic pressure is increased to the point where the valve 41 is pushed downwardly sufficiently to cause the surface 46 thereof to engage the plunger 37, the valve member 41 will be tilted by said engagement and will permit increased flow of filtered fluid therepast. The force of the spring 44 urging the valve member 41 into closed position is readily overcome by the hydraulic pressure created by a downward push on the handle 17.

After all of the sample has been expelled from the casing 13, the tester may be removed from the can 10 and the head 12 may be removed therefrom to give easy access to the filter pad 28. The deposit of sediment and dirt on the pad 28 obtained by the operation just described is the measure of the purity of the fluid tested. Upon removal of the pad 28 from the disc 27 the improved head 12 may then be completely disassembled for cleaning purposes by unscrewing the cap 34 therefrom.

Various changes and modifications may be made without departing from the spirit of the invention, and all of such changes are contemplated as may come within the scope of the claims.

What we claim is:

1. In a sediment tester head having a tubular body provided with an inner end and an outer end, an annular valve seat formed in said body near said inner end, a valve member having an inner face and having an outer face which is angled to extend obliquely of the axis of said tubular body, said inner face being normally in sealing engagement with said seat for controlling the flow of fluid through said body, spring means biasing said valve member against its seat, whereby said valve will open in response to a predetermined pressure on said inner face, and means including an axially movable plunger positioned adjacent the outer end of said body and having a portion engageable with said angled outer face of the valve member for also moving said valve member to open position in response to axial movement of said plunger, said plunger having a portion which projects exteriorly of said body.

2. In a sediment tester head having a tubular body provided with an inner end and an outer end, an annular valve seat formed in said body near said inner end, a valve member having an inner face and having an outer face which is angled to extend obliquely of the axis of said tubular body, said inner face being normally in sealing engagement with said seat for controlling the flow of fluid through said body, a helical spring surrounding said angled outer face of the valve member urging said valve member into sealing engagement with said seat, whereby said valve will open in response to a predetermined pressure on said inner face, and means including an axially movable plunger positioned adjacent the outer end of said body and engageable with said angled outer face of the valve member for also moving said valve member to open position in response to axial movement of said plunger.

3. In a sediment tester head having a tubular body provided with an inner end and an outer end, an annular valve seat formed in said body near said inner end, a valve member having an inner face and having an outer face which is angled to extend obliquely of the axis of said tubular body, said inner face being normally in sealing engagement with said seat for controlling the flow of fluid through said body, spring means biasing said valve against its seat, whereby said valve will open in response to a predetermined pressure on said inner face, an apertured cap threaded on the outer end of said body, and a plunger slidably mounted in said cap and engageable with said angled outer face of the valve member for also moving said valve member to open position, said plunger having a portion which projects exteriorly of said cap.

4. In a sediment tester head having a tubular body provided with an inner end and an outer end, an annular valve seat formed in said body near said inner end, a valve member having an inner face and having an angled outer face, said inner face being normally in sealing engagement with said seat for controlling the flow of fluid through said body, an apertured cap threaded on the outer end of said body, a helical spring supported by said cap and engaging said valve member with the angled face of the valve member positioned within said helical spring to urge said valve member into sealing engagement with said seat, and a plunger slidably carried by said cap coaxially with said spring, said plunger having an end portion projecting exteriorly of said cap and having its opposite end engageable with said outer angled face of the valve member to move said valve member to open position in response to inward movement of said plunger.

5. In a sediment tester head having a tubular body provided with an inner end and an outer end, an annular valve seat formed in said body near said inner end, a valve member having an inner face formed with an annular groove and having an angled outer face, said annular groove being normally in sealing engagement with said annular seat for controlling the flow of fluid through said body, an apertured cap threaded on the outer end of said body, a helical spring positioned within said body and engaging said valve member and said cap to urge said valve member into sealing engagement with said seat, and a plunger slidably carried by said cap, said plunger having an enlarged head positioned exteriorly of said cap and having its opposite end normally spaced from said outer angled face of the valve member and engageable with said face upon inward sliding movement of the plunger to tilt said valve member to open position, said valve member being normally positioned for rectilinear movement to open position in response to a predetermined pressure thereon acting to compress said helical spring.

6. A sediment tester comprising a liquid pump having a tubular body provided with a suction opening and having piston means for sucking liquid into and for expelling liquid from said opening, a valve seat in said body between said piston and said suction opening, a valve member having an inner face and having an inclined outer face, spring means biasing said inner face into sealing engagement with said seat for controlling the flow of liquid through said body, and said valve member being positioned for movement to open position in response to a predetermined pressure on said inner face created by fluid expelling movement of said pump piston, and means including a movably mounted plunger positioned for engagement with said outer inclined face of the valve member for also moving said valve to open position, said plunger having an exteriorly projecting end for contact with the bottom of a liquid receptacle.

7. A device for testing the sediment in vessel contained liquids, comprising a suction tube formed of separable sections, a normally closed spring loaded valve controlling the flow through the outer end portion of said tube, said valve being mounted for movement to open position in response to a predetermined fluid pressure thereagainst from said tube, means at the outer end of the tube extending to said valve and operable upon contact with the bottom of the liquid-containing vessel to open the valve, and a filter member within said tube adjacent the union of a pair of the tube sections.

8. A device for testing the sediment in vessel contained liquids, comprising a suction tube having an opening at its outer end for receiving and expelling liquid, a normally closed spring loaded valve controlling the flow of liquid through said tube, said valve being mounted for movement to open position in response to a predetermined fluid pressure thereagainst from within said tube, means at the outer end of said tube extending to said valve and operable upon contact with the bottom of the liquid containing vessel to open the valve, and a filter member within said tube.

9. A sediment tester comprising a liquid pump having a tubular body provided with a suction opening and having piston means for sucking liquid into and for expelling liquid from said opening, a valve seat in said body between said piston and said suction opening and facing said suction opening, a spring loaded valve member having an inner face normally in sealing engagement with said seat for controlling the flow of liquid through said body, said valve being positioned for movement to open position in a direction toward said suction opening in response to a predetermined pressure on said inner face created by fluid expelling movement of said pump piston, an exteriorly projecting contact member, and means between said contact and valve member for opening the latter in response to engagement of the contact member with the bottom of a liquid receptacle.

WALTER D. LUCAS.
    WALTER EBERT.
    JOSEPH S. KESSLER.

REFERENCES CITED

The following references are of record in the file of this patent:

UNITED STATES PATENTS

| Number | Name | Date |
| --- | --- | --- |
| 703,103 | Weber | June 24, 1902 |
| 1,083,467 | Sloan | Jan. 6, 1914 |
| 1,621,857 | Seraphin | Mar. 22, 1927 |
| 1,681,966 | Zeidler | Aug. 28, 1928 |
| 1,893,735 | Evers | Jan. 10, 1933 |
| 1,963,080 | Featherstone | June 19, 1934 |
| 2,153,894 | Lang | Apr. 11, 1939 |
| 2,197,909 | Wendler | Apr. 23, 1940 |
| 2,208,032 | Hooper | July 16, 1940 |
| 2,271,715 | Saffell | Feb. 3, 1942 |
| 2,272,898 | Olcott | Feb. 10, 1942 |
| 2,336,120 | Null | Dec. 7, 1943 |